(12) United States Patent
Wiercienski et al.

(10) Patent No.: US 11,545,114 B2
(45) Date of Patent: Jan. 3, 2023

(54) METHODS AND APPARATUS FOR DATA CONTENT INTEGRITY

(71) Applicant: QUALCOMM Incorporated, San Diego, CA (US)

(72) Inventors: Paul Christopher John Wiercienski, Toronto (CA); John Chi Kit Wong, Aurora (CA); Rahul Gulati, San Diego, CA (US); Gary Arthur Ciambella, Newmarket (CA); Sreekanth Modaikkal, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 17/092,165

(22) Filed: Nov. 6, 2020

(65) Prior Publication Data
US 2022/0020340 A1 Jan. 20, 2022

Related U.S. Application Data

(60) Provisional application No. 63/051,663, filed on Jul. 14, 2020.

(51) Int. Cl.
*G06F 13/00* (2006.01)
*G09G 5/37* (2006.01)
(Continued)

(52) U.S. Cl.
CPC ............ *G09G 5/37* (2013.01); *G06F 16/2365* (2019.01); *G06F 21/64* (2013.01); *G06T 1/20* (2013.01); *G09G 2380/10* (2013.01)

(58) Field of Classification Search
CPC .............. G06V 10/25; G09G 2330/12; G09G 2380/10; G09G 2358/00; G09G 3/006; G09G 5/377; G09G 5/38; H04N 19/167; H04N 21/4728; G06T 1/20; G06T 2207/20016; G06T 2207/30256; G06T 7/11
See application file for complete search history.

(56) References Cited

U.S. PATENT DOCUMENTS

2009/0225189 A1\* 9/2009 Morin .................... H04N 5/345
348/229.1
2015/0016693 A1\* 1/2015 Gattuso .................. G06V 40/16
382/118
(Continued)

OTHER PUBLICATIONS

International Search Report and Written Opinion—PCT/US2020/059746—ISA/EPO—Apr. 19, 2021.

*Primary Examiner* — Hau H Nguyen
(74) *Attorney, Agent, or Firm* — Procopio, Cory, Hargreaves & Savitch LLP

(57) ABSTRACT

The present disclosure relates to methods and apparatus for data processing, e.g., a display processing unit (DPU). The apparatus may receive data including a plurality of data bits, the data being associated with at least one data source. The apparatus may also determine whether at least a portion of the data corresponds to priority data, the priority data being within a region of interest (ROI). The apparatus may also detect an adjustment amount of the received data when at least a portion of the data corresponds to priority data, the data being displayed or stored based on the detected adjustment amount.

38 Claims, 13 Drawing Sheets

(51) Int. Cl.
*G06T 1/20* (2006.01)
*G06F 16/23* (2019.01)
*G06F 21/64* (2013.01)

(56) References Cited

U.S. PATENT DOCUMENTS

2017/0098332 A1* 4/2017 Knight .................... H04N 7/18
2017/0132784 A1* 5/2017 Yamada ............. G01B 11/2416
2018/0240397 A1    8/2018 Hara
2020/0198466 A1    6/2020 Gulati et al.

* cited by examiner

METHODS AND APPARATUS FOR DATA CONTENT INTEGRITY

CROSS REFERENCE TO RELATED APPLICATIONS

This application claims the benefit of U.S. Provisional Application Ser. No. 63/051,663, entitled "METHODS AND APPARATUS FOR DATA CONTENT INTEGRITY" and filed on Jul. 14, 2020, which is expressly incorporated by reference herein in its entirety.

TECHNICAL FIELD

The present disclosure relates generally to processing systems and, more particularly, to one or more techniques for data or display processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processor, a display processing unit (DPU), a GPU, a CPU, a display, a compositor, and/or a frame processor. The apparatus may receive data including a plurality of data bits, the data being associated with at least one data source. The apparatus may also determine whether at least a portion of the data corresponds to priority data, the priority data being within a region of interest (ROI). The apparatus may also detect an adjustment amount of the received data when at least a portion of the data corresponds to priority data, the data being displayed or stored based on the detected adjustment amount. Additionally, the apparatus may generate a data signature for the received data based on the adjustment amount of the received data. The apparatus may also determine whether the adjustment amount is less than or equal to a data adjustment threshold. The apparatus may also communicate the data based on the detected adjustment amount.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
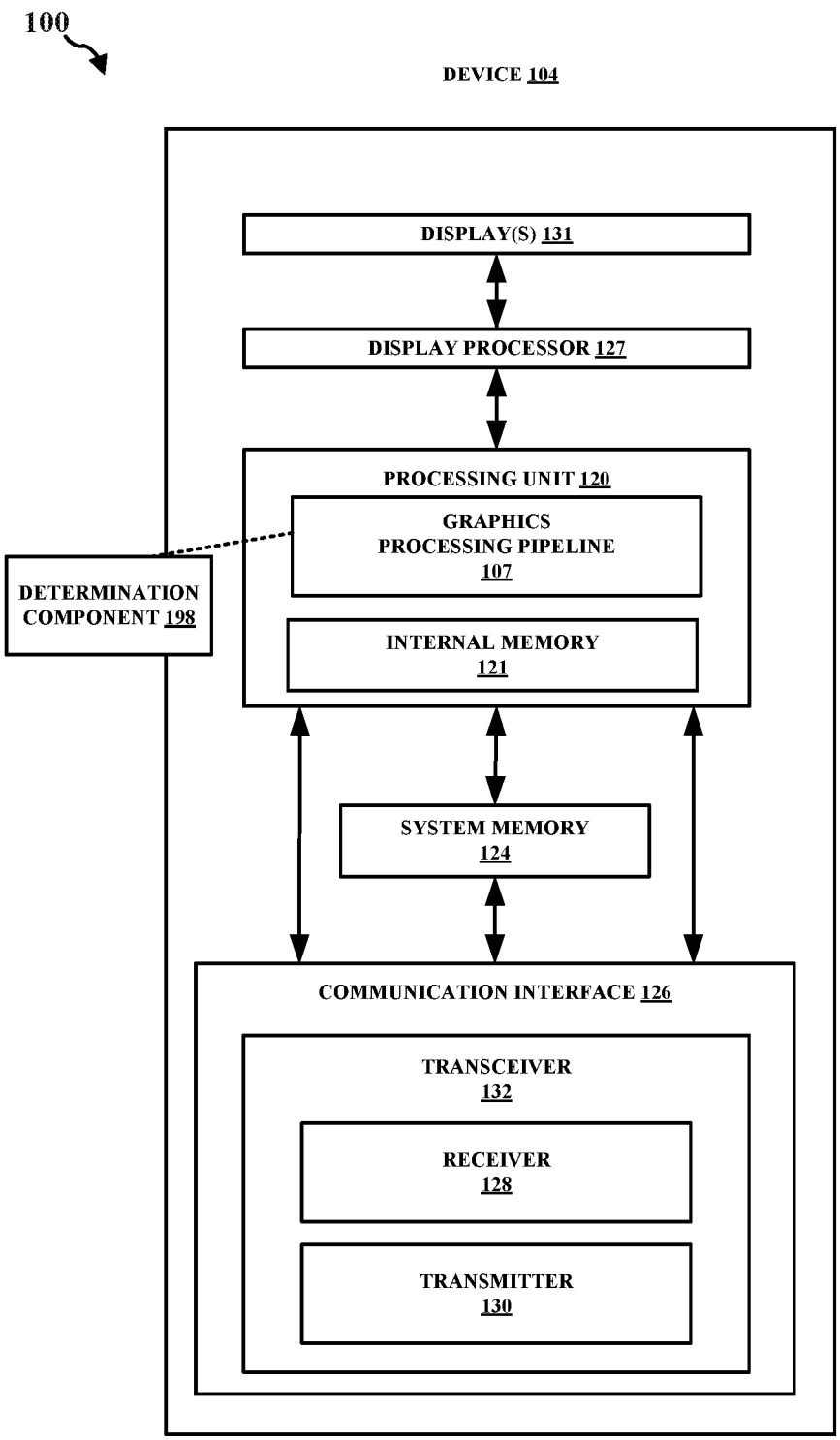
FIG. 1 is a block diagram that illustrates an example content generation system in accordance with one or more techniques of this disclosure.

Display sub-systems are utilized in safety applications, where the image data on the display may be used for several driver assistance functions and/or for instrument clusters. A failure to display the correct or accurate data can lead to a violation of defined safety goals for automotive applications, e.g., a rear view camera system, front collision warning system, traffic sign recognition, parking assistance systems, and instrument cluster displays providing sign information. For example, a frozen display during a rear view camera application or automated driving function can lead to life threatening injuries. Additionally, multiple-input signature register (MISRs) can be implemented for regions of interest (ROIs) as a key automotive safety mechanism within the display subsystem. The ability to ensure data content integrity for the image data is an important trait. MISRs are not well studied within the context of safety applications, while cyclic redundancy checks (CRCs) have a rich history of use in safety applications in many industries including aviation. Supporting CRCs rather than MISRs may allow higher design coverage. In some instances, a CRC polynomial selection may be a highly specialized domain. Also, the selection of an appropriate polynomial may utilize knowledge of the application and polynomial characteristics. A programmable CRC may provide leverage to dislodge existing competitor solutions by removing a significant barrier to migration. Aspects of the present disclosure can include display sub-systems capable of simultaneously handling safety and non-safety display image content for different applications, e.g., automotive applications. The present disclosure relates to the usage of a display sub-systems in functional safety automotive applications. Specifically, the present disclosure relates to ADAS and instrument clusters in safety automotive applications involving the use of display sub-systems. The present disclosure also relates to a systematic methodology to ensure data content integrity for displays, e.g., instrument clusters, rear view camera applications, surround view systems, and automated driving applications. Moreover, the present disclosure includes a systematic methodology to perform a concurrent online CRC calculation for a user configurable selected region of interest within the display image. Software configurable CRC polynomials may be static per customer or change on a frame-by-frame or use case basis.

Various aspects of systems, apparatuses, computer program products, and methods are described more fully hereinafter with reference to the accompanying drawings. This disclosure may, however, be embodied in many different forms and may not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art can appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to each other over the bus or a different connection.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to receive data including a plurality of data bits, the data being associated with at least one data source. The determination component 198 may also be configured to determine whether at least a portion of the data corresponds to priority data, the priority data being within a region of interest (ROI). The determination component 198 may also be configured to detect an adjustment amount of the received data when at least a portion of the data corresponds to priority data, the data being displayed or stored based on the detected adjustment amount. The determination component 198 may also be configured to generate a data signature for the received data based on the adjustment amount of the received data. The determination component 198 may also be configured to determine whether the adjustment amount is less than or equal to a data adjustment threshold. The determination component 198 may also be configured to communicate the data based on the detected adjustment amount.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
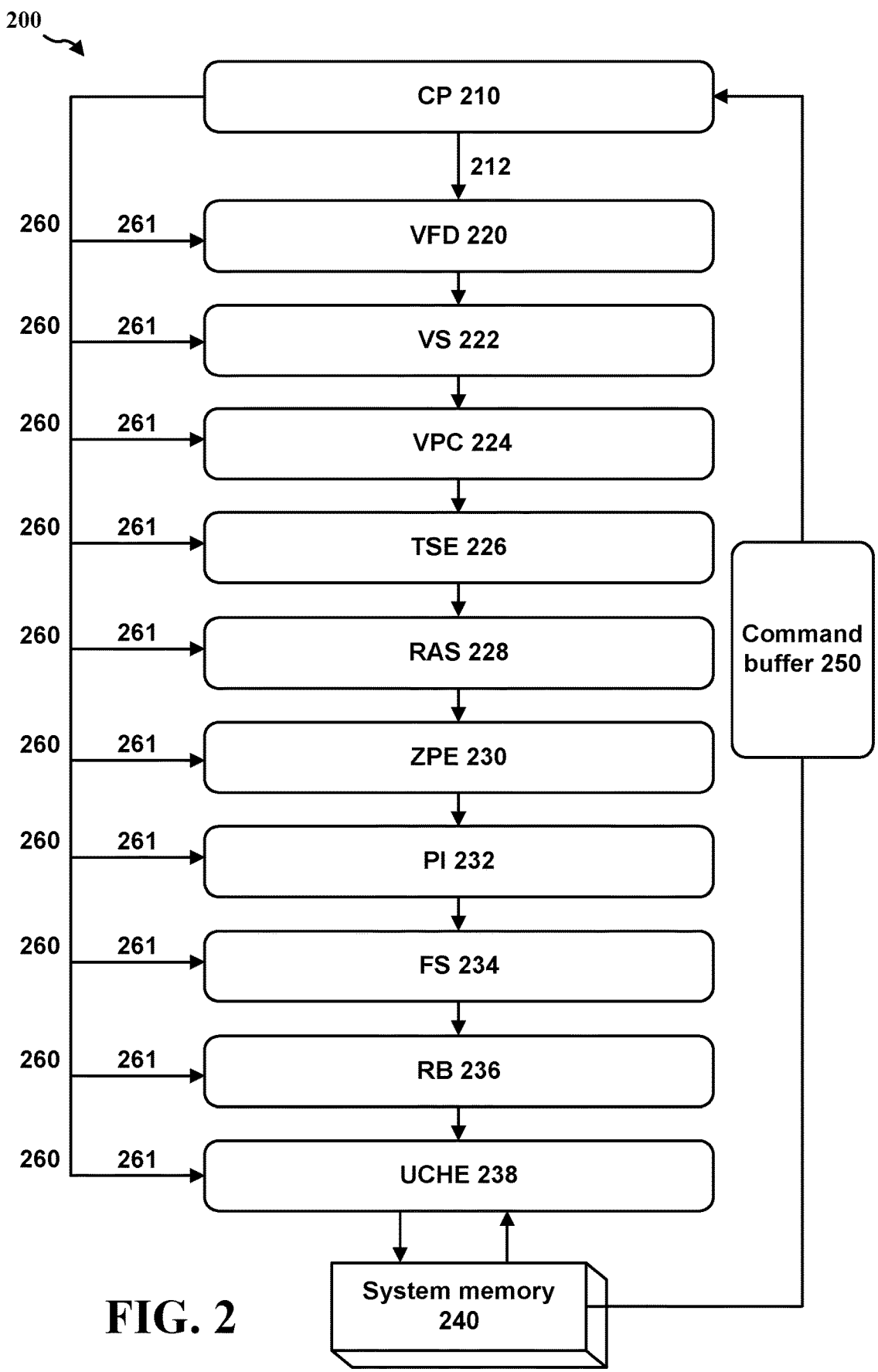
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

Aspects of mobile devices or smart phones can utilize buffer mechanisms to distribute or coordinate a buffer between an application rendering side of the device, e.g., a GPU or CPU, and a display or composition side of the device, e.g., a display engine. For instance, some mobile devices can utilize a buffer queue mechanism to distribute or coordinate a buffer between an application rendering side and a display or composition side, which can include a buffer compositor or a hardware composer (HWC). In some aspects, the application rendering side can be referred to as a producer, while the display or composition side can be referred to as a consumer. Additionally, a synchronization divider or fence can be used to synchronize content between the application rendering side and the display or composition side. Accordingly, a fence can be referred to as a synchronization divider, and vice versa.

Some systems, such as advanced driver assistance systems (ADAS), may need to fulfill functional safety specifications, e.g., as indicated by the International Organization for Standardization (ISO) 26262, and functional safety standards for vehicles. ISO 26262 has set a challenge for the whole of the automotive supply chain. Each party, e.g., semiconductor vendors, Tier 1s, and original equipment manufacturers (OEMs), can work together in order to achieve compliance. A key functional safety specification may be to ensure data content integrity for selected parts of the image data being sent to the displays.

In some aspects, a display sub-system may be utilized in automotive applications. For these systems, the image data on the display may be used for several driver assistance functions and/or for instrument clusters. A failure to display the correct or accurate data can lead to a violation of defined safety goals for automotive applications, e.g., a rear view camera system, front collision warning system, traffic sign recognition, parking assistance systems, and instrument cluster displays providing sign information. For example, a frozen display during a rear view camera application or automated driving function can lead to life threatening injuries.

Additionally, multiple-input signature register (MISRs) can be implemented for regions of interest (ROIs) in a display as a key automotive safety mechanism within the display subsystem. As mentioned herein, the ability to ensure data content integrity for the image data is an important trait. MISRs are not well studied within the context of safety applications, while cyclic redundancy checks (CRCs) have a rich history of use in safety applications in many industries including aviation. Supporting CRCs rather than MISRs may allow higher design coverage to be claimed in ISO 26262 analysis and thus help with Automotive Safety Integrity Level (ASIL) certification.

In some instances, a CRC polynomial selection may be a highly specialized domain. Also, the selection of an appropriate polynomial may need knowledge of the application and polynomial characteristics. A poor choice in the polynomial selection process can lead to unexpectedly high rates of undetected errors in a CRC application. A programmable CRC may move the burden of polynomial selection to the OEM. Existing safety applications may be built assuming a particular polynomial. A programmable CRC may provide leverage to dislodge existing competitor solutions by removing a significant barrier to migration. This can provide the ability for OEMs to mix different safety applications with different polynomials. This can also provide a market place advantage.

Figure 3:
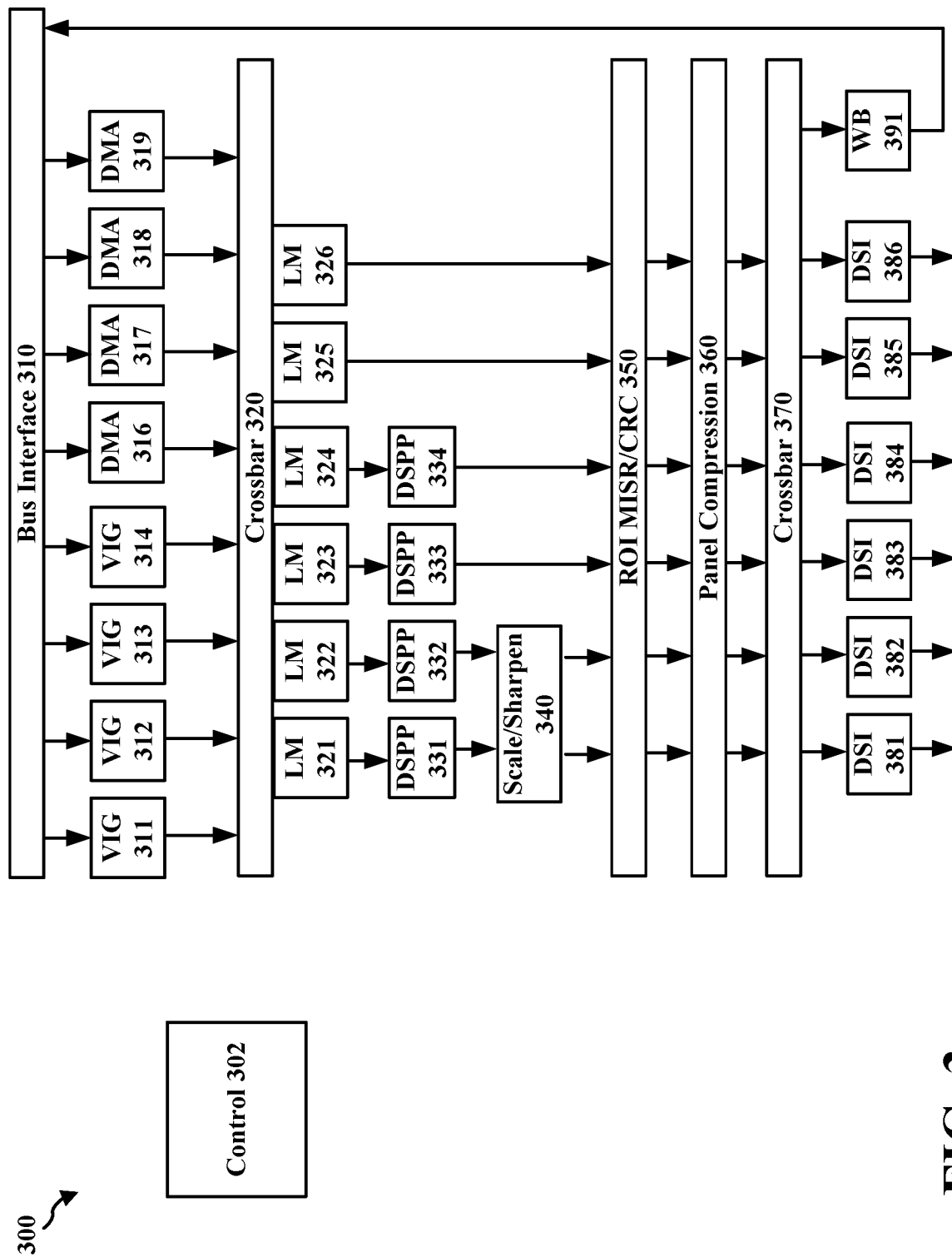
FIG. 3 illustrates an example diagram of data processing in accordance with one or more techniques of this disclosure.

FIG. 3 illustrates diagram 300 of data processing. More specifically, diagram 300 is a display processing unit (DPU) area breakdown. As shown in FIG. 3, diagram 300 includes control unit 302, bus interface 310, video graphics (VIG) components 311-314, direct memory access (DMA) components 316-319, crossbar 320, layer mixer (LM) components 321-326, destination surface processor pipe (DSPP) components 331-334, scale/sharpen component 340, ROI MISR/CRC 350, panel compression component 360, crossbar 370, display serial interface (DSI) components 381-386, and write back (WB) component 391. FIG. 3 displays the use of region of interest (ROI) multiple-input signature register (MISRs), as well as CRCs, e.g., ROI MISR/CRC 350, in the display sub-system for automotive applications. As depicted in FIG. 3, a large percentage of the DPU design may be upstream of the CRC 350, such that it may receive protection.

Certain data processing designs, e.g., diagram 300, can provide a high design coverage with a low area cost compared to other solutions, such as error checking and correcting (ECC) code. However, it may be beneficial for display sub-systems to be capable of simultaneously handling safety and non-safety display image content for different applications, e.g., automotive applications.

Aspects of the present disclosure can include display sub-systems capable of simultaneously handling safety and non-safety display image content for different applications, e.g., automotive applications. Aspects of the present disclosure relate to the usage of a display sub-systems in functional automotive applications. Specifically, aspects of the present disclosure relate to ADAS and instrument clusters in automotive applications involving the use of display sub-systems. Aspects of the present disclosure also relate to a systematic methodology to ensure data content integrity for displays, e.g., instrument clusters, rear view camera applications, surround view systems, and automated driving applications. Moreover, aspects of the present disclosure include a systematic methodology to perform a concurrent online CRC calculation for a user configurable selected region of interest (ROI) within the display image. Aspects of the present disclosure also relate to software configurable CRC polynomials which may be static per customer or change on a frame-by-frame or use case basis. Additionally, aspects of the present disclosure allow for different polynomials to be selected for different regions of interest within the display image.

Aspects of the present disclosure relate to a systematic methodology to perform a concurrent offline data integrity safety analysis for a user configurable selected region of interest (ROI) that may encompass a safety significant display image. Aspects of the present disclosure also relate to a systematic methodology to perform user configurable selection of pixel(s) within the ROI that may encompass the safety significant display image. In addition, aspects of the present disclosure relate to a systematic methodology to perform a concurrent online CRC calculation for a user configurable selection of pixels within the ROI that may encompass the safety significant display image. Accordingly, aspects of the present disclosure can include a number of different ROI shapes. For example, the ROI may be a rectangular shape, a circular shape, as well as a fully arbitrary shape. Further, aspects of the present disclosure relate to software configurable ROI in its entirety or selective to a subset of pixels from the safety significant display image considered applicable for offline safety analysis, which may be changeable on a frame-by-frame basis.

Aspects of the present disclosure include a generic, configurable hardware block (i.e., a parallel CRC block) that can process a number of data bits, e.g., N bits of data, input per clock cycle. The block may consist of N bits of data input and an M bit flop storage for the CRC value. For each CRC flop bit, there may be an associated exclusive OR (XOR) structure in which each of the N bits of input data and M bits of current CRC state can contribute as controlled by an individual enable. Also, aspects of the present disclosure may be highly pipelineable making the maximum clock frequency (FMAX) a function of polynomial degree and not based on a number of bits processed per clock cycle. Some deployments may support certain sizes of CRC, e.g., a 32-bit CRC. In some aspects, once the hardware supports a maximum size CRC, e.g., a 32-bit CRC, the hardware may also support any size CRC up to that size, e.g., a 16-bit CRC or a 24-bit CRC.

Figure 4:
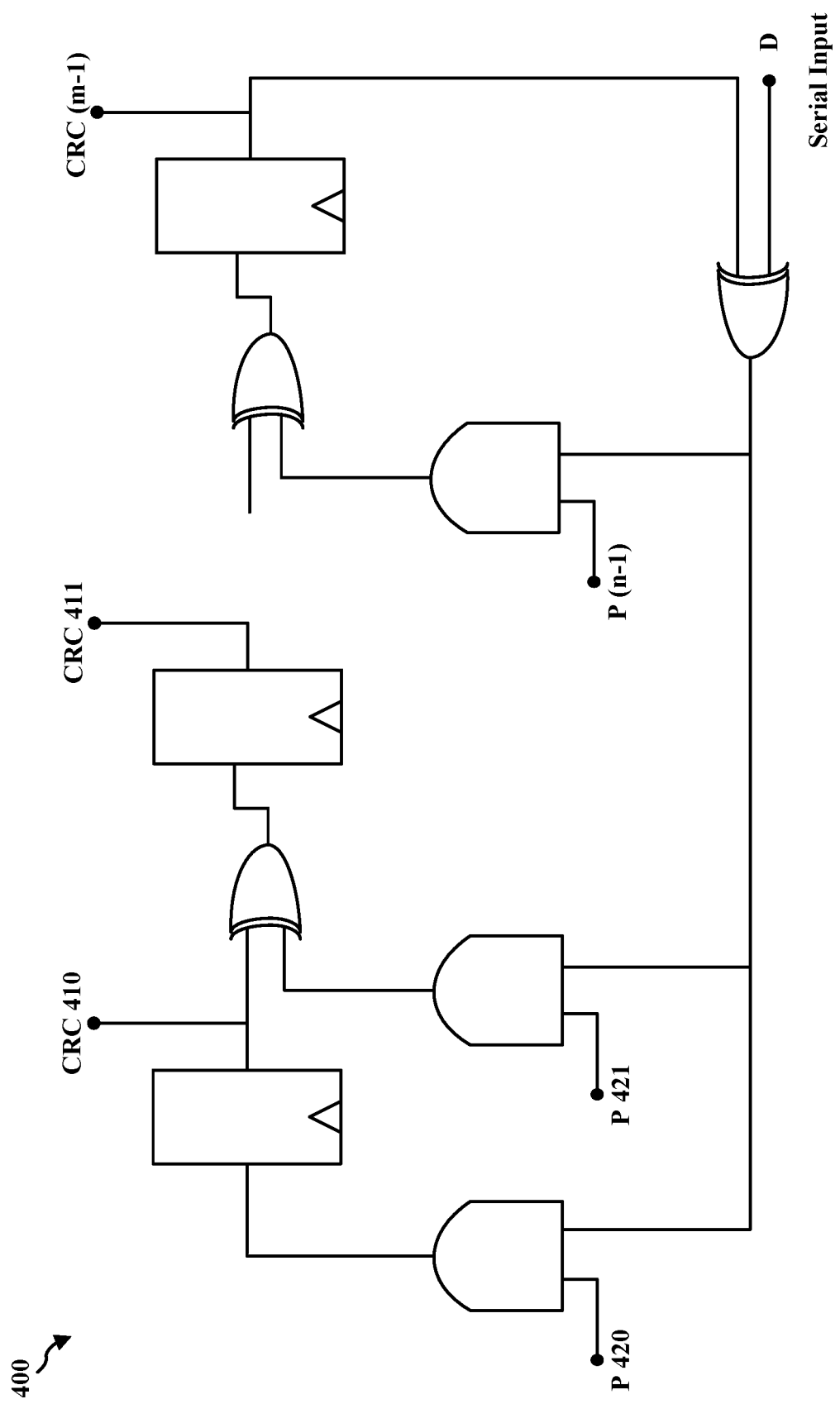
FIG. 4 illustrates an example diagram of data processing in accordance with one or more techniques of this disclosure.

FIG. 4 illustrates diagram 400 of data processing in accordance with one or more techniques of this disclosure. More specifically, diagram 400 illustrates a traditional CRC circuit with an M bit polynomial capable of processing 1-bit of data per clock cycle. As shown in FIG. 4, diagram 400 includes CRC 410, CRC 411, CRC (m−1), P 420, P 421, P (n−1), and serial input. Diagram 400 can be a 1-bit per operation algorithm. Also, diagram 400 can be a polynomial controlled by individual enabled bits, e.g., Pn.

In some instances, aspects of the present disclosure may include a parallel CRC circuit that may be generalized to allow M bits to be processed in each clock cycle. Usage of a CRC for high data rate signals, such as display pixel data, may utilize the ability to process many bits of data during each clock cycle. Each CRC and data bit may contribute to each updated CRC bit. Further, there may be a dependent polynomial, as well as a polynomial controlled by individual enable bits, e.g., EN_CRC(j,i) and EN_D(k,i). As indicated herein, a decomposition process may help to generate these individual enable bits.

Figure 5:
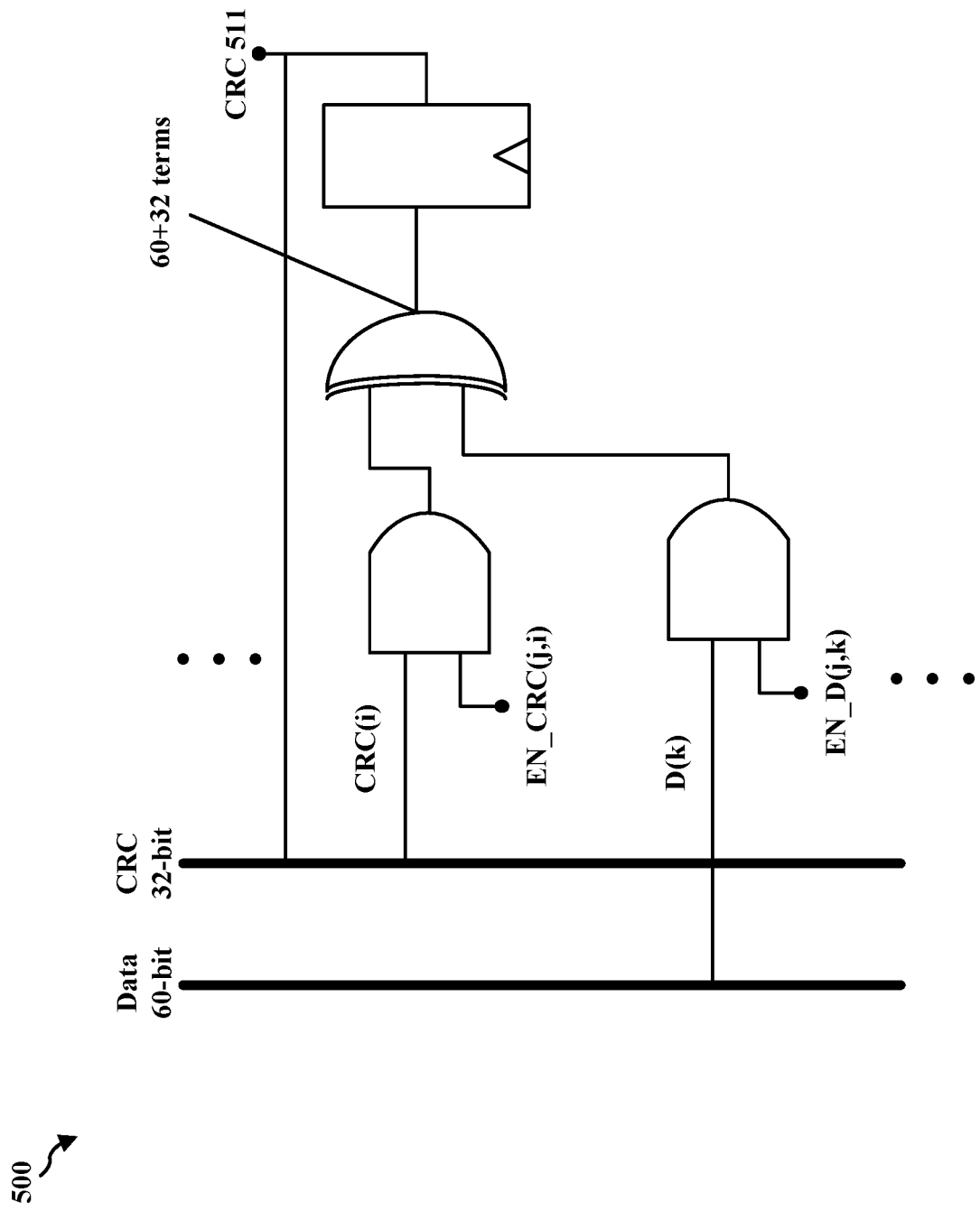
FIG. 5 illustrates an example diagram of data processing in accordance with one or more techniques of this disclosure.

FIG. 5 illustrates diagram 500 of data processing in accordance with one or more techniques of this disclosure. As shown in FIG. 5, diagram 500 includes CRC 511, CRC(i), D(k), EN_CRC(j,i), and EN_D(j,k). Diagram 500 displays a 32-bit CRC capable of processing 60-bits per clock cycle. As indicated in FIG. 5, in some instances, CRC implementations may process two 30-bits pixels per clock cycle. This may need a certain number of configuration bits to control, e.g., (60+32)*32=2944 bits.

Figure 6:
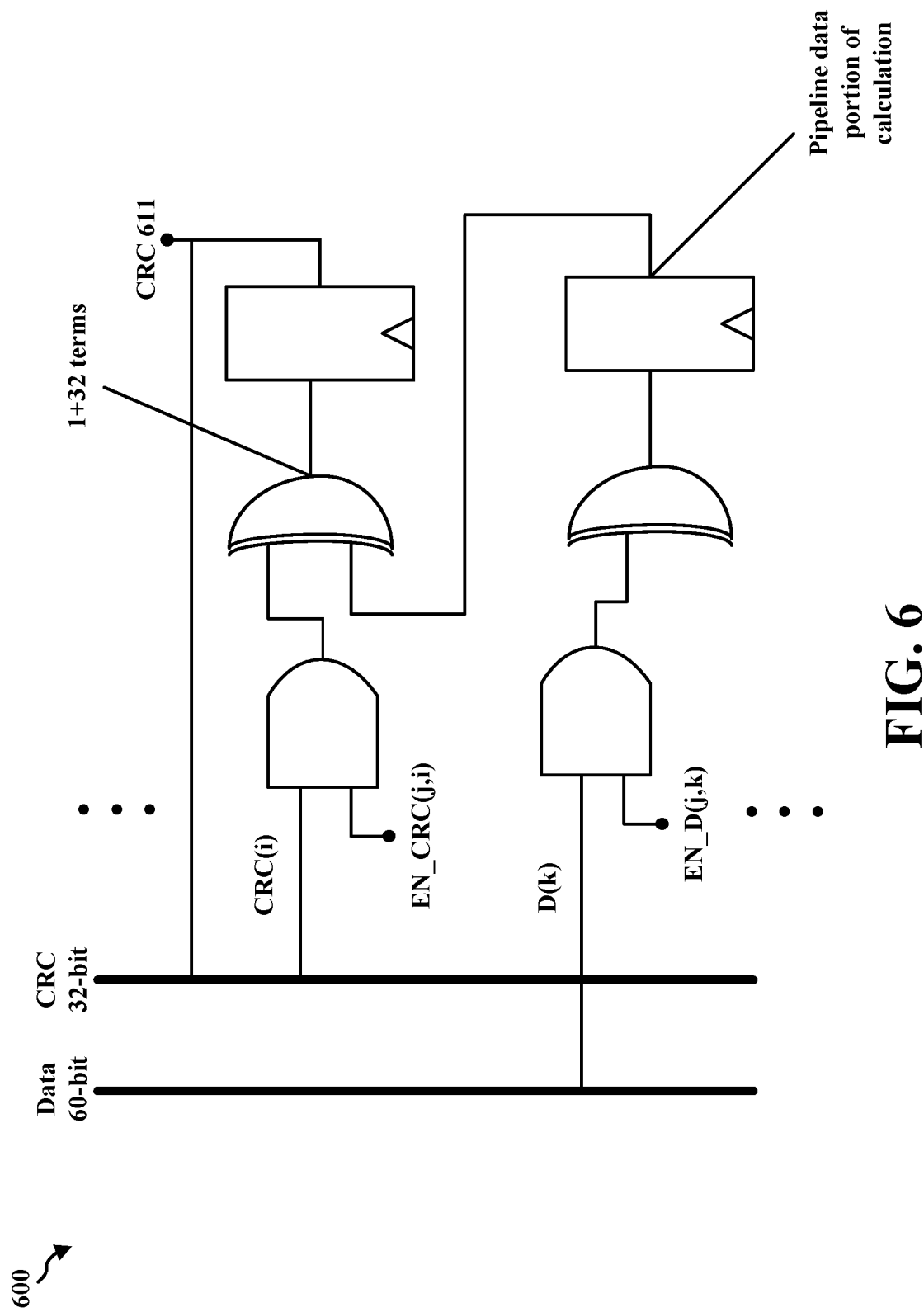
FIG. 6 illustrates an example diagram of data processing in accordance with one or more techniques of this disclosure.

FIG. 6 illustrates diagram 600 of data processing in accordance with one or more techniques of this disclosure. Diagram 600 includes CRC 611, CRC(i), D(k), EN_CRC(j, i), and EN_D(j,k). As shown in FIG. 6, data components of calculation can be pipelined in order to reduce the number of combinational terms. Also, the pipelining of data components of calculation can be increased as necessary. Further, the maximum operating frequency may be independent of the number of data bits processed per clock cycle.

Aspects of the present disclosure can also include a parallel CRC block, which can be shared by N regions of interest (ROIs). In instrument cluster applications, independent CRC signatures may be collected in different parts of the display. A number of different groups, e.g., four (4) separate groups, may be assumed. Also, the number of ROIs utilized by OEMs may be rising, which can increase the hardware cost of CRC hardware without the use of hardware sharing.

Figure 7:
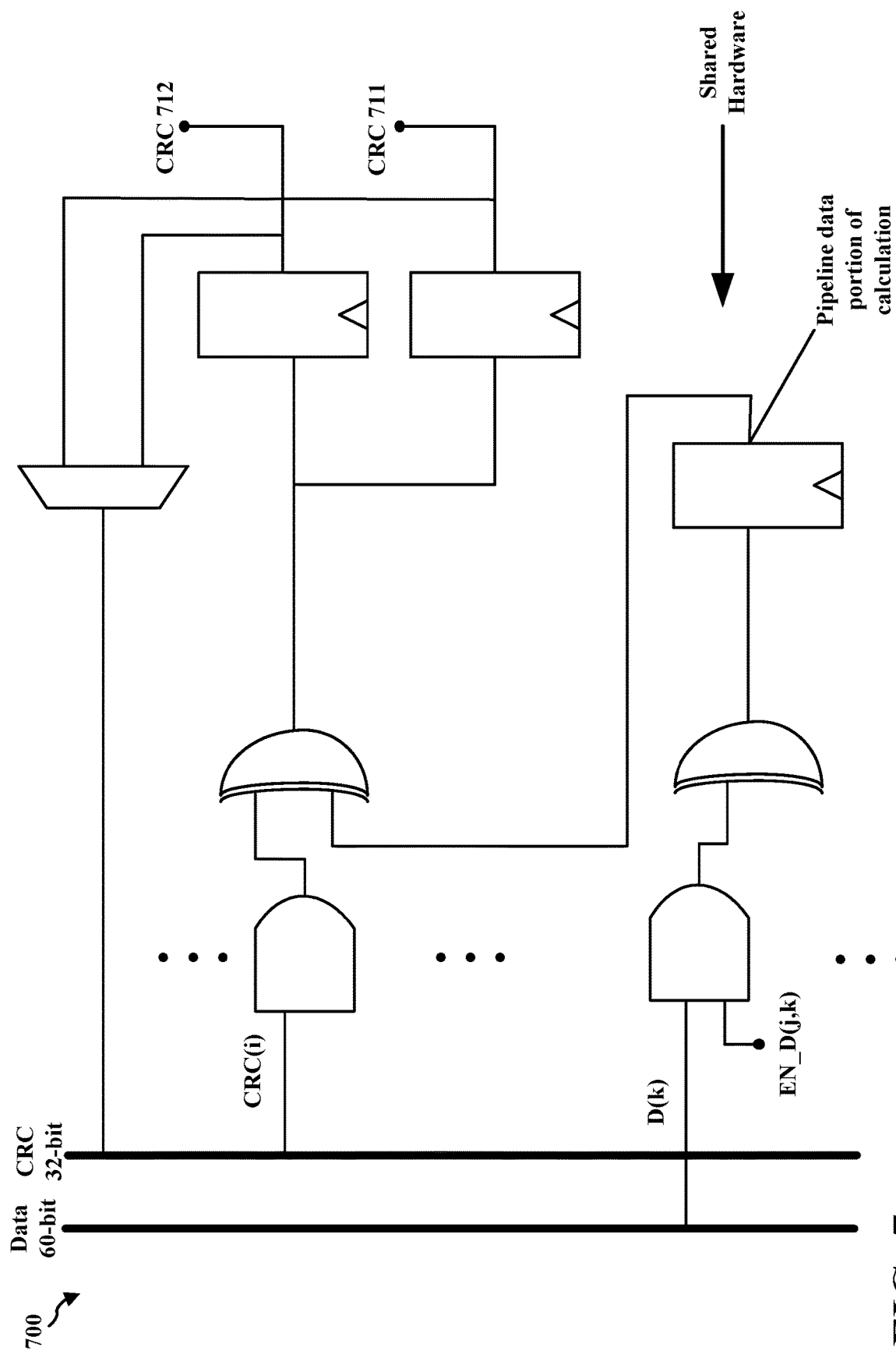
FIG. 7 illustrates an example diagram of data processing in accordance with one or more techniques of this disclosure.

FIG. 7 illustrates diagram 700 of data processing in accordance with one or more techniques of this disclosure. Diagram 700 includes CRC 711, CRC 712, CRC(i), D(k), and EN_D(j,k). As shown in FIG. 7, aspects of the present disclosure can also include sharing hardware between ROIs. In some aspects, taking advantage of the fact that instrument cluster icons may not physically overlap, one CRC signature may be updated at a time. This may result in each ROI having its own CRC signature storage, while the signature calculation circuitry can be shared, which may result in large area savings.

Aspects of the present disclosure can also include numerous polynomial implementation variations. For instance, polynomial decomposition, of a common polynomial, can be shared between each of the ROIs. As indicated above, the decomposition process may help to generate individual enable bits. By doing so, aspects of the present disclosure can maximize area savings. Alternatively, multiple polynomials can be decomposed and stored. For example, there may be 16 ROIs actively using two unique polynomials. The correct set of enables may be multiplexed (muxed) into the shared CRC hardware based on the particular ROI being processed.

In some aspects of the present disclosure, there may be numerous CRC context switching options available. For example, the diagrams herein show a mux to select between multiple ROIs. Extending this muxing to a large number of ROIs may lead to timing paths. This may be avoided by preloading the CRCs into local CRC holding registers. Also, multiple sets of registers may hold current CRC context, e.g., CRC-A and CRC-B. This may avoid having N ROIs directly connected to an XOR structure. While working in one CRC, e.g., CRC-A, aspects of the present disclosure may preload another CRC, e.g., CRC-B, for the next ROI (and vice versa). This may be a cost effective implementation that avoids impacting FMAX.

Figure 8:
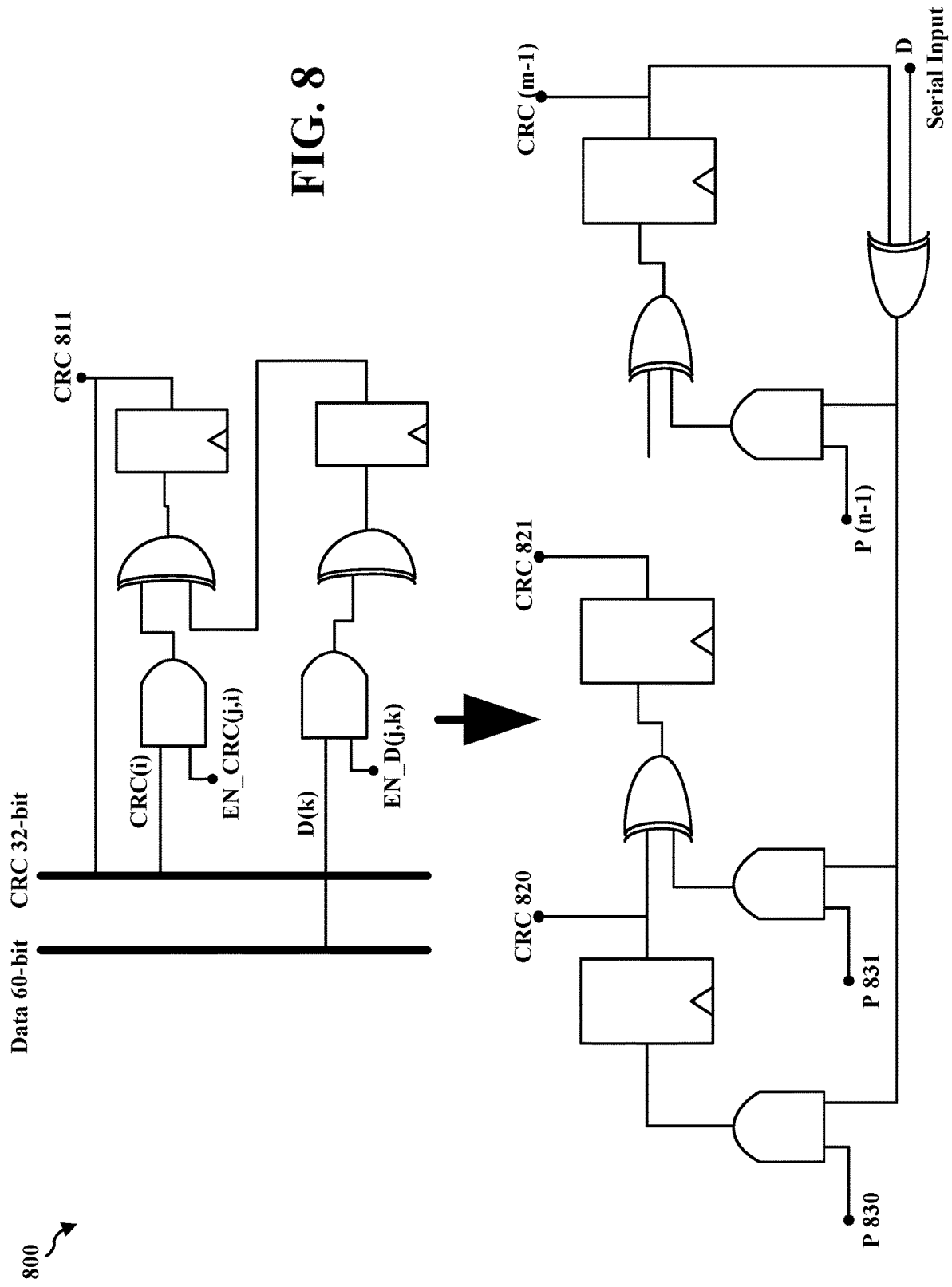
FIG. 8 illustrates an example diagram of data processing in accordance with one or more techniques of this disclosure.

FIG. 8 illustrates diagram 800 of data processing in accordance with one or more techniques of this disclosure. Diagram 800 includes CRC 811, CRC(i), D(k), EN_CRC(j, i), EN_D(j,k), CRC 820, CRC 821, CRC (m−1), P 830, P 831, P (n−1), and serial input. As illustrated in FIG. 8, aspects of the present disclosure can also include polynomial decomposition via a parallel CRC block reconfiguration. As depicted in FIG. 8, the polynomial enable terms can be calculated by feeding an impulse of length (N+M) to a serial CRC configured with the desired polynomial and recording the M bit CRC values at each step. The resulting set of bits, e.g., M*(N+M) bits, may form the polynomial enables for a parallel CRC hardware block. For example, the impulse may be: a '1' followed by (N+M−1) '0's. The parallel CRC block can also be used to perform its own decomposition to avoid burdening software with directly managing the individual enable terms, or avoid having dedicated decomposition hardware. This may be accomplished by configuring the enables to use a single data bit and setting the enables to match the serial CRC polynomial.

Aspects of the present disclosure can also include a serial configuration of the aforementioned blocks. For instance, the hardware may program a parallel CRC block as if it was a serial CRC block for the decomposition process.

Aspects of the present disclosure can also include MISR decomposition via hardware block reconfiguration. In some instances, the parallel CRC block with appropriately set enable terms can be used to calculate a MISR signature. Also, the MISR signature s may be calculated N bits at a time. For example, in a DPU, MISRs may be calculated on a 30-bit pixel, but the data path may be wider, e.g., processing two pixels per clock. The polynomial terms may be calculated by feeding an impulse of length (N+M) to a base MISR implementation (i.e., a 30-bit implementation). For example, the impulse may be: a '1' followed by (N+M−1) '0' terms. The parallel CRC block can be used to perform its own MISR decomposition. No additional hardware may be utilized. This can be accomplished by configuring the enables to use a single data bit and setting the enables to match the base MISR implementation. Other XOR algorithms can be supported by allowing software the ability to directly program the enable bits or providing similar decomposition strategies in hardware.

Aspects of the present disclosure can also include a parallel CRC hardware capable of processing less than N bits per clock cycle. The parallel CRC block may be configured to process N bits per clock cycle. For example, it may be configured to process two 30-bit pixels per clock cycle. The same hardware can also be used to process less data. For example, an ROI may contain an odd number of pixels which may result in a number of bits, e.g., 30 bits, being processed in some circumstances while another number of bits, e.g., 60 bits, are generally processed. In these cases, the enables are a subset of the larger case. The desired calculation may be achieved by masking out the unwanted enable terms without utilizing a new decomposition of the polynomial. This can be useful for handling a variable number of pixels per clock cycle or other applications with specifications for variable processing word lengths.

Additionally, aspects of the present disclosure can include real time configurability. The flexibility of the hardware may allow it to be reconfigured to meet the specifications of the customer, such as support for polynomial degree of any size up to M, where M is the maximum size provisioned for in the hardware. Also, the hardware may allow for support for any arbitrary polynomial, support for CRC, MISR, or other XOR based signature algorithms, as well as support for any order of bits within the pixel, e.g., swizzling the locations of red/green/blue (RGB) and whether the pixels are processed least significant bit (LSB) or most significant bit (MSB) first.

The parallel CRC block can be reconfigured in real time, which may utilize a certain number of clock cycles, e.g., N+M clock cycles, to complete the decomposition. For example, to support a 32-bit CRC processing 60-bits per clock cycle, a number of clock cycles, e.g., 92 clock cycles, may be utilized for configuration. This may allow for a number of reconfiguration options. Aspects of the present disclosure can also include two independent safety applications with unique polynomials used on the instrument cluster. One option may be to decompose and store the enables for both polynomials. For instance, a number of ROIs, e.g., ROI A, ROI B, and/or ROI C, may belong to one safety application while another ROI, e.g., ROI D, may belong to a separate rear view camera safety application.

Assuming a rapid decomposition, the polynomial can be decomposed on the fly by the hardware. In this manner, each ROI can use a unique polynomial without increasing the enable storage. In practice, this may lead to having to decompose the polynomials numerous times while raster scanning through the pixels leading to significant complexity. Numerous simplifications may be possible, for example, if the dashboard configuration is such that the rearview camera application is at the bottom of the screen while the telltale icons are at the top of the screen, then a single switching of the polynomial may be utilized.

Aspects of the present disclosure may also time cycle a single polynomial over different frame times. For example, during one frame time, the present disclosure can collect CRC signatures for the ROIs using polynomial P0, and during the next frame time, the present disclosure can collect CRC signatures for ROIs using polynomial P1. Method selection may depend on a fault tolerant time interval (FTTI). In practice, this method may be sufficient for most applications.

In addition, the present disclosure can include data content integrity ensured without ECC on display sub-system memories. This can be executed during normal system operation without entering a dedicated test mode. Aspects of the present disclosure can also provide the flexibility to support different safety applications with different polynomial specifications. Also, aspects of the present disclosure can result in minimal die area impact on a system-on-chip (SoC) via hardware resource sharing. Aspects of the present disclosure can also include the ability to run the test at-speed in the field, i.e., concurrent online testing. Aspects of the present disclosure can also include the ability to detect permanent faults and intermittent faults in display sub-system logic and memories.

Aspects of the present disclosure can include a number of advantages, such as increasing the claimed design coverage for the display in a cost efficient manner. This can boost customer confidence in safety applications, such as in advanced driver assistance systems (ADAS) space and instrument cluster space. In some instances, it can be challenging to use a display sub-system without this mechanism for safety applications. This can also provide OEMs more flexibility in integrating disparate safety applications on SOCs. Also, this can allow the polynomial to provide the flexibility to be selected. Further, this can help to meet the functional safety specifications for display sub-systems as specified in the ISO 26262 functional safety standard. Additionally, this can help to meet customer specific ASIL compliance, e.g., as specified in ISO 26262 functional safety standard. Moreover, aspects of the present disclosure can enhance existing display sub-system MISR features for safety ADAS applications through targeted design changes.

In some aspects, the ability to ensure data content integrity for the safety display image performed by customized offline solutions may be important. Aspects of the present disclosure may utilize procedures invested in a pro-long period of time in order to sanitize their solution from a safety analysis point of view in order to motivate leverage. This may minimize the re-building of a customer database if the procedures leverage CRC mechanisms to ensure data integrity. Aspects of the present disclosure may also utilize an alternative approach to CRC mechanisms for ensuring data integrity, such as a possible reduction of false positives from a safety analysis point of view. Aspects of the present disclosure may also enable more offline safety mechanisms to ensure the safety content is visually uncompromised compared to bit exact data integrity validation, which may minimize false positives that may not be visually a hazard. Additionally, aspects of the present disclosure may utilize visibility checks for safety material when combined with non-safety material. Aspects of the present disclosure may also enable industrial designers to have wider array of visually appealing contents for safety elements to combine with non-safety elements.

Some aspects of the present disclosure may also minimize the overall system bandwidth (BW) and processor utilisation, which in turn may bring KPI to a level that honors a fault tolerant time interval (FTTI). This may take away the burden for the hardware and software to be certified, e.g., ASIL certified, which may minimize an engineering cost and speed up the time to market. Aspects of the present disclosure may also result in more flexibility and re-usability for customers. In some instances, aspects of the present disclosure may allow a customer may have a wide range of flexibility in terms of the geometry of pixels that can collect a CRC value for safety diagnostics. For customers specifying a higher ASIL capability, aspects of the present disclosure may offer an independent and redundant diagnostic path for safety significant content. For example, aspects of the present disclosure may enable ASIL decomposition, such as a strategy that may utilize independence and redundancy to implement functional safety specifications.

Aspects of the present disclosure can include a number of component diagrams, e.g., diagrams including components of data processing when utilizing CRCs. For instance, diagrams of the present disclosure may include data capture components, software, hardware, memory, display processing units (DPUs), and displays. Each of these components may communicate with one another during data processing, such as when utilizing CRCs.

Figure 9:
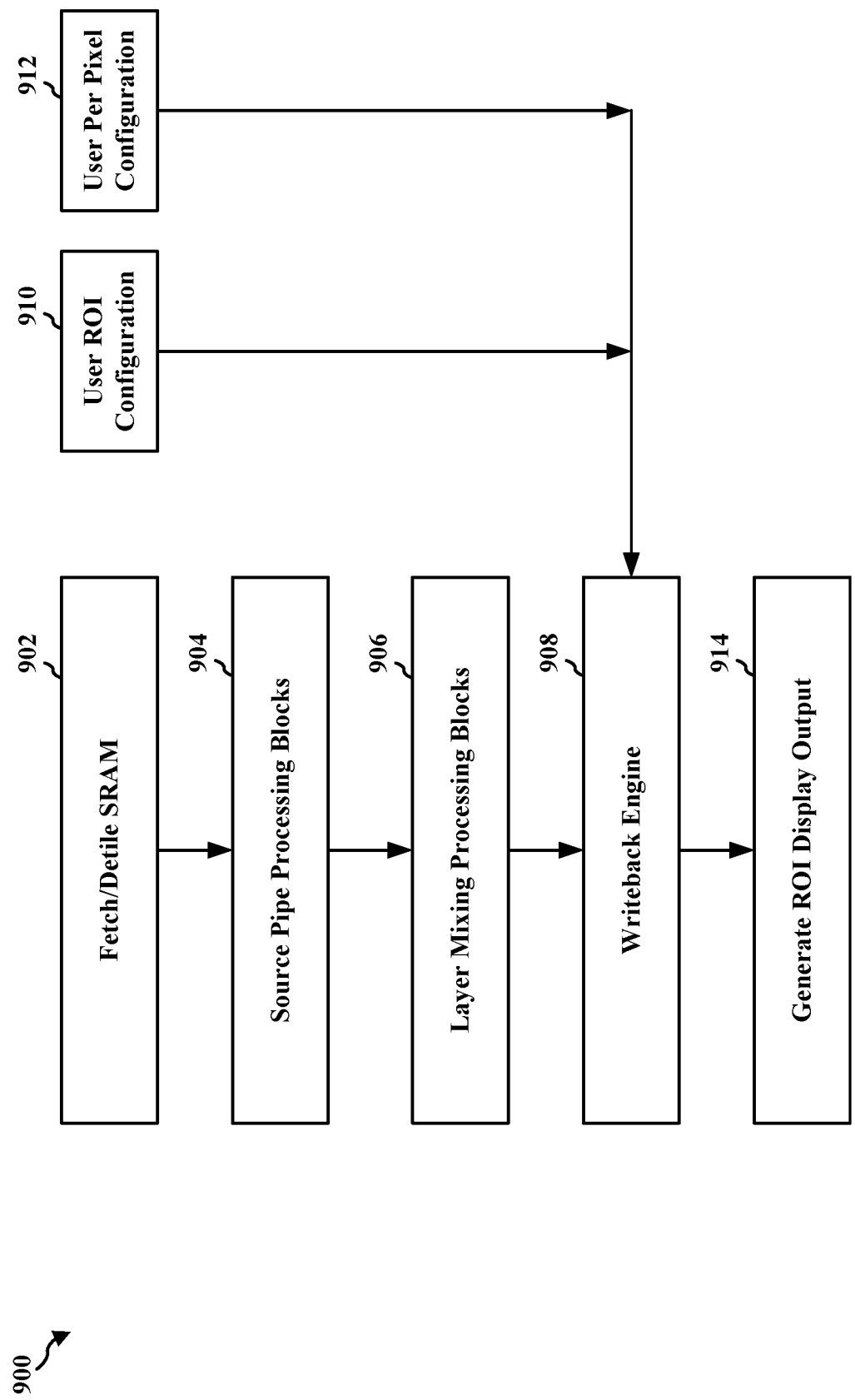
FIG. 9 illustrates an example diagram of data processing in accordance with one or more techniques of this disclosure.

FIG. 9 illustrates diagram 900 of data processing in accordance with one or more techniques of this disclosure. As shown in FIG. 9, diagram 900 includes a number of components for data processing. More specifically, diagram 900 includes a number of hardware blocks for configuring a particular ROI. As shown in FIG. 9, block 902 includes fetch and detile static random access memory (SRAM). Block 902 can be connected to block 904 which includes source pipe processing blocks. Block 904 can be connected to block 906 which includes layer mixing processing blocks. Block 906 can be connected to block 908 which includes a writeback engine. Block 908 can be connected to block 910 which includes a user ROI configuration, as well as block 912 which includes a user per pixel configuration. Finally, block 908 can be connected to block 914, at which aspects of the present disclosure generate the ROI display output.

As shown in FIG. 9, aspects of the present disclosure may include a configurable hardware block that allows a user to configure a particular region of interest (ROI) in the memory writeback together with selected pixel(s) that are of a specific interest for the offline safety analysis mechanism. Further, aspects of the present disclosure may include a configurable hardware block that allows a user to configure a set of pixels within the configurable ROI. This may effectively reduce the pixel throughput if the ROI is less than or equal to the full image or screen.

Figure 10:
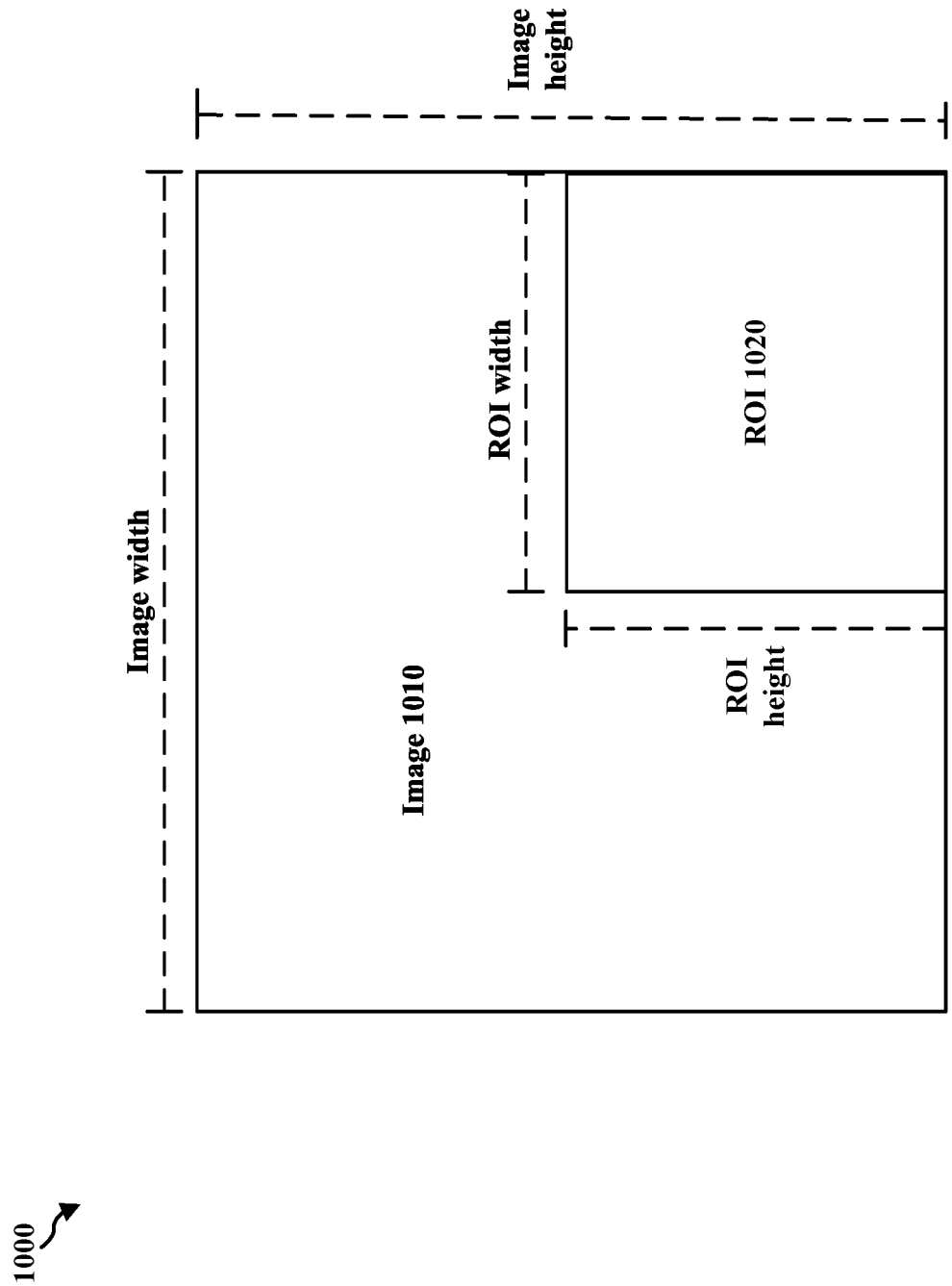
FIG. 10 illustrates an example diagram of an image in accordance with one or more techniques of this disclosure.

FIG. 10 illustrates diagram 1000 of an image in accordance with one or more techniques of this disclosure. As shown in FIG. 10, diagram 1000 includes image 1010, which includes a region of interest (ROI) 1020. The image 1010 includes an image width and an image height. Likewise, the ROI 1020 includes an ROI width and an ROI height. Although ROI 1020 is shown in the bottom corner of image 1010, ROI 1020 may be located anywhere within image 1010. In some instances, the ROI 1020 can be stored in a memory or buffer.

Figure 11:
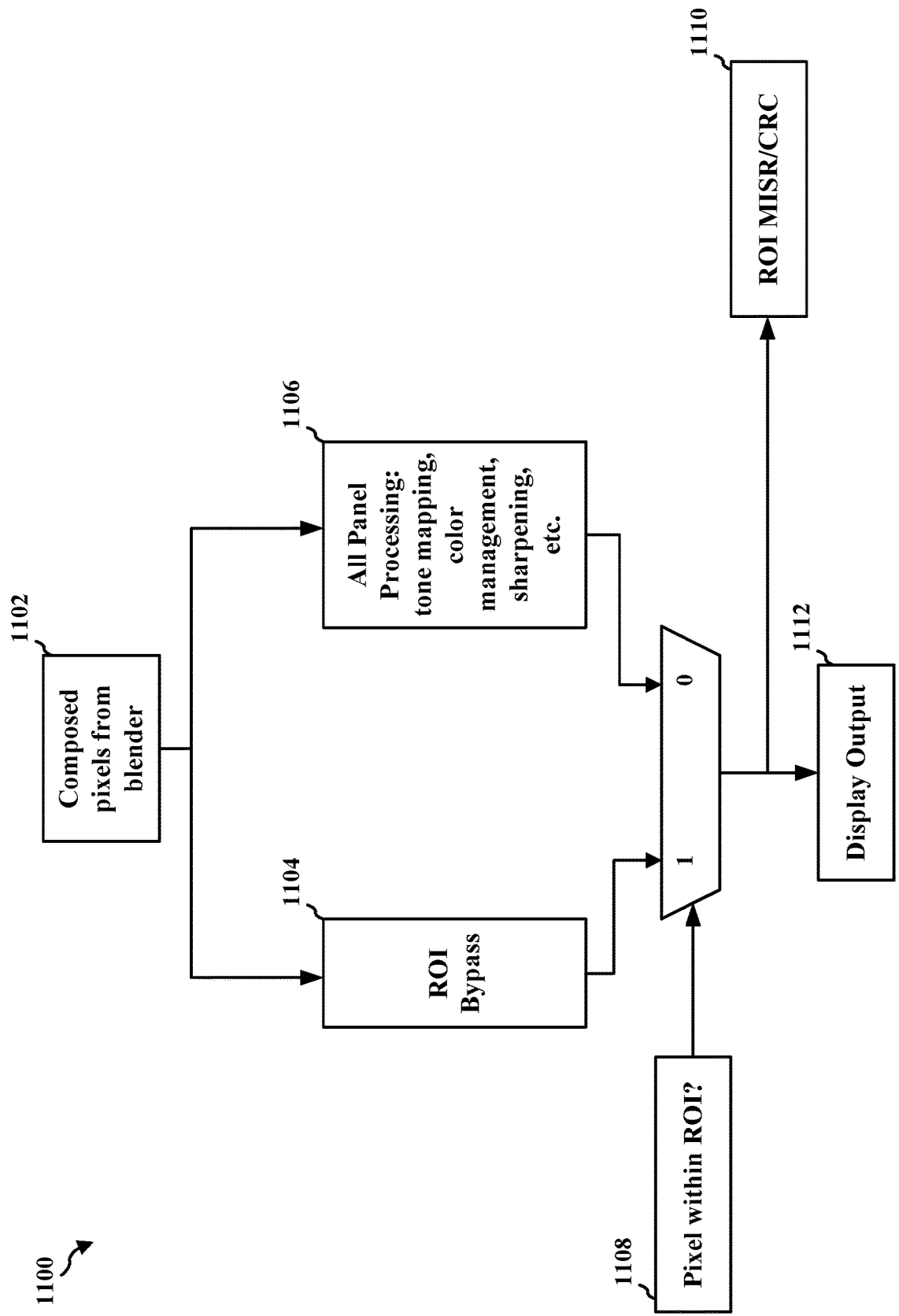
FIG. 11 illustrates an example diagram of data processing in accordance with one or more techniques of this disclosure.

FIG. 11 illustrates diagram 1100 of data processing in accordance with one or more techniques of this disclosure. As shown in FIG. 11, diagram 1100 includes a number of steps or processes for data processing of the present disclosure. At 1102, a number of composed pixels may be input from a blender. At 1104, aspects of the present disclosure may perform an ROI bypass. At 1106, aspects of the present disclosure may perform an all panel processing, e.g., tone mapping, color management, and/or sharpening processing. At 1108, aspects of the present disclosure may determine whether a pixel is within a ROI. At 1110, aspects of the present disclosure may determine an ROI with a MISR or a CRC. At 1112, aspects of the present disclosure may output to a display. Diagram 1100 is also a bypass mechanism that may be utilized with arbitrarily shaped ROIs. For instance, the mux controlled by 1108 may select a panel processed pixel unless the pixel is within a rectangular ROI and the pixel within that ROI is tagged as being a safety pixel. This may allow for ROI with non-rectangular shapes.

As depicted in FIG. 11, pixels may be on the uppermost layer fed into the layer mixer. These pixels may be associated with alpha information, where the foreground alpha is set to a certain value, e.g., 1.0, and the background alpha is set to a certain value, e.g., 0. Moreover, these pixels may be fully opaque upper layer pixels. For instance, aspects of the present disclosure may define a fully opaque pipe with a foreground alpha of 1.0 and background of 0.0. This may be the case for arbitrarily shaped safety icons. Further, aspects of the present disclosure may blend safety content with the background. While the present disclosure may run the CRC on fully opaque pixels, the present disclosure may allow soft blending around the edges with the background material for a visually appealing result while still maintaining safety. In some aspects, different pipes, e.g., ViG/DMA pipes, can be used to fetch different safety layer icons, so long as each of those regions is displayed on the topmost layer of the display at the location of the panel. In some aspects, the pixel output from the mixer may bypass any pixel processing to ensure there may be no tampering with the data integrity. The bypass data path may be configured with an ROI that is as big, or bigger than, the ROI configured to the writeback engine. This may also be utilized with online CRC calculations.

Additionally, per-pixel alpha information may be propagated to the writeback engine, as well as utilized with online CRC calculations. For instance, any alpha with a pixel value of 1.0 may be written out to memory without tampering, while all other pixels may be written as black. This mechanism introduced may allow the collection of CRC signatures on non-rectangular, arbitrarily sized, safety content. Any pixels with non-opaque alpha values may be excluded from the signature generation. This may allow the OEMs to smoothly blend the safety icons with a background display canvas material while also having a deterministic safety signature e.g., telltale over a map, etc.

In some aspects, safety display image writeback may be functional if the ROI also encompasses pixels that specifies security enforcement. Some aspects of security enforcement may prohibit the writeback memory being accessible by non-privileged processors, which may compromise the safety use case, as that may specify general purpose processor(s) access for safety analysis over a software algorithm. In some instances, if a pipeline if configured secure, the secure protection bit may propagate to the writeback engine. Also, the writeback engine may observe each pixel, such as whether it is safety significant, secure, or both, and then decide to writeback the original pixel or black out the pixel if the memory writeback is not a protected memory. For instance, if a pixel is deemed safety significant and secure, then the writeback engine may writeback the safety pixel since it is opaque from a security robustness point of view, with no confidentiality is being lost. Aspects of the present disclosure may also include the ability to run safety applications out of standard memory, e.g., rather than out of secure memory. Hence, aspects of the present disclosure may include the ability to black out secure content, i.e., the ability to include moving play back.

Additionally, aspects of the present disclosure may include real time configurability to the writeback a ROI, writeback safety pixels, or writeback the entirety of the ROI pixels. The safety pixel mapping within the ROI may also be real time configurable, as that may be a function of the alpha channel of that particular pixel, as well as a function of the z-order of that particular safety image being the top-most. In some instances, these configurations may be doubled buffer and/or programmable on a per-frame basis. Aspects of the present disclosure may also achieve certain hardware architectural metrics, e.g., as per ISO 26262 functional safety standard, such as a single point fault metric (SPFM) and a latent point fault metric (LPFM) via an improved design coverage. Aspects of the present disclosure may also allow customers to leverage offline safety mechanisms in order to ensure visual safety, as well as minimize false positives when it is not visually a hazard. Aspects of the present disclosure may also allow customers to have a wider array visually, which may appeal contents for safety elements to combine with non-safety elements.

Figure 12:
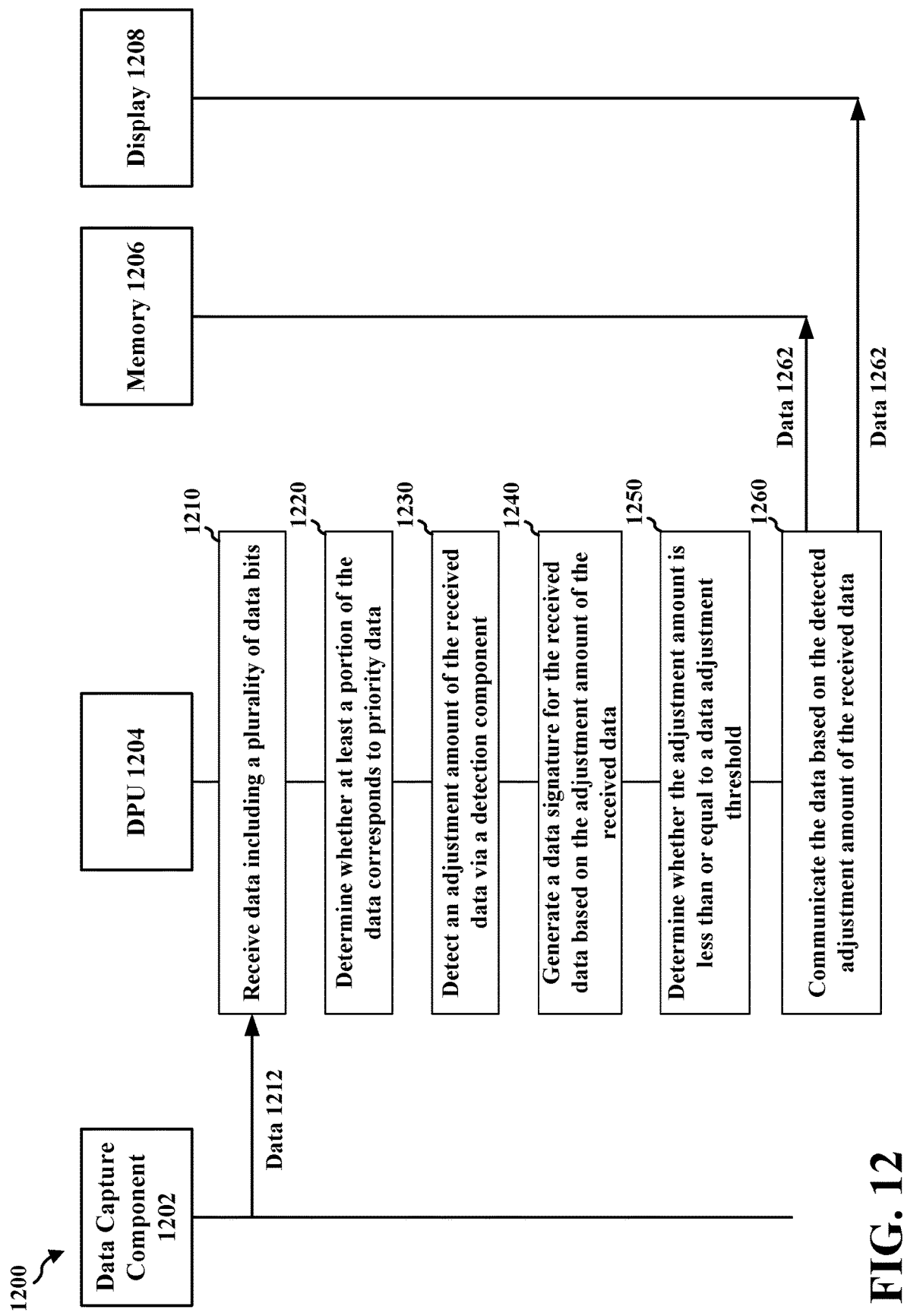
FIG. 12 illustrates an example communication flow diagram of data processing in accordance with one or more techniques of this disclosure.

FIG. 12 illustrates a communication flow diagram 1200 of data processing in accordance with one or more techniques of this disclosure. As shown in FIG. 12, diagram 1200 includes data capture component 1202, DPU 1204, memory 1206, and display 1208.

At 1210, DPU 1204 may receive data, e.g., data 1212, including a plurality of data bits, the data being associated with at least one data source. As shown in FIG. 12, data capture component 1202 may transmit data 1212 to DPU 1204. In some aspects, the at least one data source may correspond to a region of interest (ROI), e.g., ROI 1020.

At 1220, DPU 1204 may determine whether at least a portion of the data corresponds to priority data, the priority data being within a region of interest (ROI), e.g., ROI 1020.

In some aspects, the priority data may be safety data. The safety data may be displayed at an upper layer of a display, e.g., display 1208, where the safety data may be displayed as one or more safety pixels, where the ROI, e.g., ROI 1020, may be a portion of the display, e.g., display 1208. The one or more safety pixels may correspond to one or more opaque pixels. Further, each of the one or more safety pixels may be associated with alpha information, the alpha information including at least one of a foreground alpha value or a background alpha value.

At 1230, DPU 1204 may detect an adjustment amount of the received data, e.g., data 1212, when at least a portion of the data corresponds to priority data, where the data may be displayed or stored based on the detected adjustment amount. In some instances, the adjustment amount may be detected based on at least one detection algorithm, the at least one detection algorithm corresponding to at least one cyclic redundancy check (CRC), e.g., CRC at step 1110 in FIG. 11. Also, the at least one CRC may include at least one polynomial, the at least one polynomial being programmable or configurable. The adjustment amount may be detected based on at least one detection algorithm. The adjustment amount may also be detected by a display processing unit (DPU), e.g., DPU 1204. Further, the adjustment amount may be detected based on at least one detection algorithm, the at least one detection algorithm corresponding to at least one multiple-input signature register (MISR), e.g., MISR at step 1110 in FIG. 11, or at least one exclusive OR (XOR) algorithm.

At 1240, DPU 1204 may generate a data signature for the received data, e.g., data 1212, based on the adjustment amount of the received data. The data signature for the received data may be compared to a data signature for processed data. Moreover, the data signature for the received data may be a cyclic redundancy check (CRC) signature.

At 1250, DPU 1204 may determine whether the adjustment amount is less than or equal to a data adjustment threshold. In some aspects, the data, e.g., data 1212, may be displayed when the adjustment amount is less than or equal to the data adjustment threshold, where the data may be displayed at a display, e.g., display 1208. Also, the data, e.g., data 1212, may be stored when the adjustment amount is greater than the data adjustment threshold, where the data may be stored in at least one of a memory or a buffer, e.g., memory 1206.

At 1260, DPU 1204 may communicate the data, e.g., data 1262, based on the detected adjustment amount. For example, the data, e.g., data 1262, may be communicated in order to be stored, e.g., stored at memory 1206, or displayed, e.g., displayed at display 1208.

Figure 13:
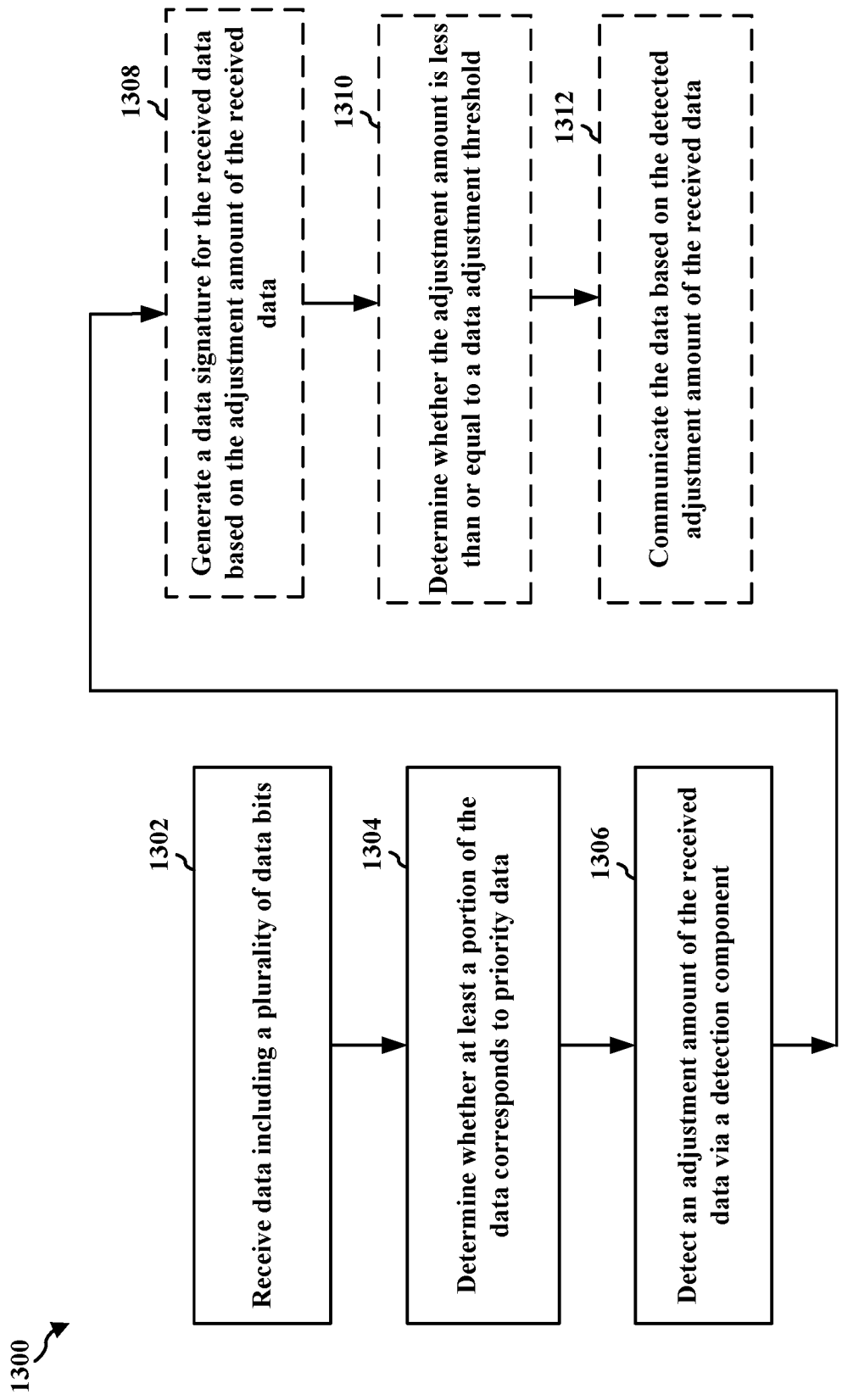
FIG. 13 illustrates an example flowchart of an example method in accordance with one or more techniques of this disclosure.

FIG. 13 illustrates an example flowchart 1000 of an example method in accordance with one or more techniques of this disclosure. The method may be performed by an apparatus, e.g., a DPU, a GPU, a CPU, a compositor, a frame processor, a display processor, a data processor, or an apparatus for data processing.

At 1302, the apparatus may receive data including a plurality of data bits, the data being associated with at least one data source, as described in connection with the examples in FIGS. 3-12. In some aspects, the at least one data source may correspond to a region of interest (ROI), as described in connection with the examples in FIGS. 3-12.

At 1304, the apparatus may determine whether at least a portion of the data corresponds to priority data, the priority data being within a region of interest (ROI), as described in connection with the examples in FIGS. 3-12.

In some aspects, the priority data may be safety data, as described in connection with the examples in FIGS. 3-12. The safety data may be displayed at an upper layer of a display, where the safety data may be displayed as one or more safety pixels, where the ROI may be a portion of the display, as described in connection with the examples in FIGS. 3-12. The one or more safety pixels may correspond to one or more opaque pixels, as described in connection with the examples in FIGS. 3-12. Further, each of the one or more safety pixels may be associated with alpha information, the alpha information including at least one of a foreground alpha value or a background alpha value, as described in connection with the examples in FIGS. 3-12.

At 1306, the apparatus may detect an adjustment amount of the received data when at least a portion of the data corresponds to priority data, the data being displayed or stored based on the detected adjustment amount, as described in connection with the examples in FIGS. 3-12. In some instances, the adjustment amount may be detected based on at least one detection algorithm, the at least one detection algorithm corresponding to at least one cyclic redundancy check (CRC), as described in connection with the examples in FIGS. 3-12. Also, the at least one CRC may include at least one polynomial, the at least one polynomial being programmable or configurable, as described in connection with the examples in FIGS. 3-12. The adjustment amount may be detected based on at least one detection algorithm, as described in connection with the examples in FIGS. 3-12. The adjustment amount may also be detected by a display processing unit (DPU), as described in connection with the examples in FIGS. 3-12. Further, the adjustment amount may be detected based on at least one detection algorithm, the at least one detection algorithm corresponding to at least one multiple-input signature register (MISR) or at least one exclusive OR (XOR) algorithm, as described in connection with the examples in FIGS. 3-12.

At 1308, the apparatus may generate a data signature for the received data based on the adjustment amount of the received data, as described in connection with the examples in FIGS. 3-12. The data signature for the received data may be compared to a data signature for processed data, as described in connection with the examples in FIGS. 3-12. Moreover, the data signature for the received data may be a cyclic redundancy check (CRC) signature, as described in connection with the examples in FIGS. 3-12.

At 1310, the apparatus may determine whether the adjustment amount is less than or equal to a data adjustment threshold, as described in connection with the examples in FIGS. 3-12. In some aspects, the data may be displayed when the adjustment amount is less than or equal to the data adjustment threshold, the data being displayed at a display, as described in connection with the examples in FIGS. 3-12. Also, the data may be stored when the adjustment amount is greater than the data adjustment threshold, the data being stored in at least one of a memory or a buffer, as described in connection with the examples in FIGS. 3-12.

At 1312, the apparatus may communicate the data based on the detected adjustment amount. For example, the data may be communicated in order to be stored or displayed, as described in connection with the examples in FIGS. 3-12.

In one configuration, a method or apparatus for graphics processing is provided. The apparatus may be a DPU, a GPU, a CPU, a compositor, a frame compositor, a frame processor, a display processor, a data processor, or an apparatus for data processing. In one aspect, the apparatus may be the processing unit 120 within the device 104, or may be some other hardware within device 104 or another device. The apparatus may include means for receiving data including a plurality of data bits, the data being associated with at least one data source. The apparatus may also include means for determining whether at least a portion of the data corresponds to priority data, the priority data being within a region of interest (ROI). The apparatus may also include means for detecting an adjustment amount of the received data when at least a portion of the data corresponds to priority data, the data being displayed or stored based on the detected adjustment amount. The apparatus may also include means for determining whether the adjustment amount is less than or equal to a data adjustment threshold. The apparatus may also include means for communicating the data based on the detected adjustment amount. The apparatus may also include means for generating a data signature for the received data based on the adjustment amount of the received data.

The subject matter described herein can be implemented to realize one or more benefits or advantages. For instance, the described display processing techniques can be used by DPUs, GPUs, CPUs, compositors, frame compositors, frame processors, display processors, or other data processors to enable the aforementioned methods and processes. This can also be accomplished at a low cost compared to other data or frame processing techniques. Moreover, the data processing techniques herein can improve or speed up data processing or execution. Further, the data processing techniques herein can improve the data utilisation and/or resource efficiency of a DPU or a GPU. Additionally, the data processing techniques herein can include methods that can improve the reliability of data transfer and/or data content integrity.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims. The following aspects are illustrative only and may be combined with other aspects or teachings described herein, without limitation.

Aspect 1 is a method of data processing. The method includes receiving data including a plurality of data bits, the data being associated with at least one data source. The method also includes determining whether at least a portion of the data corresponds to priority data, the priority data being within a region of interest (ROI). The method also includes detecting an adjustment amount of the received data when at least a portion of the data corresponds to priority data, the data being displayed or stored based on the detected adjustment amount.

Aspect 2 is the method of aspect 1, where the priority data is safety data.

Aspect 3 is the method of any of aspects 1 and 2, where the safety data is displayed at an upper layer of a display, the safety data being displayed as one or more safety pixels, the ROI being a portion of the display.

Aspect 4 is the method of any of aspects 1 to 3, where the one or more safety pixels correspond to one or more opaque pixels.

Aspect 5 is the method of any of aspects 1 to 4, where each of the one or more safety pixels is associated with alpha information, the alpha information including at least one of a foreground alpha value or a background alpha value.

Aspect 6 is the method of any of aspects 1 to 5, where the adjustment amount is detected based on at least one detection algorithm, the at least one detection algorithm corresponding to at least one cyclic redundancy check (CRC).

Aspect 7 is the method of any of aspects 1 to 6, where the at least one CRC includes at least one polynomial, the at least one polynomial being programmable or configurable.

Aspect 8 is the method of any of aspects 1 to 7, further comprising determining whether the adjustment amount is less than or equal to a data adjustment threshold.

Aspect 9 is the method of any of aspects 1 to 8, where the data is displayed when the adjustment amount is less than or equal to the data adjustment threshold, the data being displayed at a display.

Aspect 10 is the method of any of aspects 1 to 9, where the data is stored when the adjustment amount is greater than the data adjustment threshold, the data being stored in at least one of a memory or a buffer.

Aspect 11 is the method of any of aspects 1 to 10, where the adjustment amount is detected based on at least one detection algorithm.

Aspect 12 is the method of any of aspects 1 to 11, further comprising communicating the data based on the detected adjustment amount.

Aspect 13 is the method of any of aspects 1 to 12, further comprising a data signature for the received data based on the adjustment amount of the received data.

Aspect 14 is the method of any of aspects 1 to 13, where the data signature for the received data is compared to a data signature for processed data.

Aspect 15 is the method of any of aspects 1 to 14, where the data signature for the received data is a cyclic redundancy check (CRC) signature.

Aspect 16 is the method of any of aspects 1 to 15, where the at least one data source corresponds to the ROI.

Aspect 17 is the method of any of aspects 1 to 16, where the adjustment amount is detected by a display processing unit (DPU).

Aspect 18 is the method of any of aspects 1 to 17, where the adjustment amount is detected based on at least one detection algorithm, the at least one detection algorithm corresponding to at least one multiple-input signature register (MISR) or at least one exclusive OR (XOR) algorithm.

Aspect 19 is an apparatus for data processing including means for implementing a method as in any of aspects 1 to 18.

Aspect 20 is an apparatus for data processing including at least one processor coupled to a memory and configured to implement a method as in any of aspects 1 to 18.

Aspect 21 is a computer-readable medium storing computer executable code, where the code when executed by a processor causes the processor to implement a method as in any of aspects 1 to 18.

What is claimed is:

1. A method of data processing, comprising:
   receiving data including a plurality of data bits, the data being associated with at least one data source;
   determining whether at least a portion of the data corresponds to priority data, the priority data being within a region of interest (ROI);
   detecting an adjustment amount of the received data when at least the portion of the data corresponds to the priority data, the data being displayed or stored based on the detected adjustment amount; and
   determining whether the adjustment amount of the received data is less than or equal to a data adjustment threshold, wherein the data is displayed when the adjustment amount is less than or equal to the data adjustment threshold or the data is stored when the adjustment amount is greater than the data adjustment threshold.

2. The method of claim 1, wherein the priority data is safety data.

3. The method of claim 2, wherein the safety data is displayed at an upper layer of a display, the safety data being displayed as one or more safety pixels, the ROI being a portion of the display.

4. The method of claim 3, wherein the one or more safety pixels correspond to one or more opaque pixels.

5. The method of claim 3, wherein each of the one or more safety pixels is associated with alpha information, the alpha information including at least one of a foreground alpha value or a background alpha value.

6. The method of claim 1, wherein the adjustment amount is detected based on at least one detection algorithm, the at least one detection algorithm corresponding to at least one cyclic redundancy check (CRC).

7. The method of claim 6, wherein the at least one CRC includes at least one polynomial, the at least one polynomial being programmable or configurable.

8. The method of claim 1, wherein the data is displayed at a display.

9. The method of claim 1, wherein the data is stored in at least one of a memory or a buffer.

10. The method of claim 1, wherein the adjustment amount is detected based on at least one detection algorithm.

11. The method of claim 1, further comprising:
    communicating the data based on the detected adjustment amount.

12. The method of claim 1, further comprising:
    generating a data signature for the received data based on the adjustment amount of the received data.

13. The method of claim 12, wherein the data signature for the received data is compared to a data signature for processed data.

14. The method of claim 12, wherein the data signature for the received data is a cyclic redundancy check (CRC) signature.

15. The method of claim 1, wherein the at least one data source corresponds to the ROI.

16. The method of claim 1, wherein the adjustment amount is detected by a display processing unit (DPU).

17. The method of claim 1, wherein the adjustment amount is detected based on at least one detection algorithm, the at least one detection algorithm corresponding to at least one multiple-input signature register (MISR) or at least one exclusive OR (XOR) algorithm.

18. An apparatus for data processing, comprising:
a memory; and
at least one processor coupled to the memory and configured to:
receive data including a plurality of data bits, the data being associated with at least one data source;
determine whether at least a portion of the data corresponds to priority data, the priority data being within a region of interest (ROI);
detect an adjustment amount of the received data when at least the portion of the data corresponds to the priority data, the data being displayed or stored based on the detected adjustment amount; and
determine whether the adjustment amount of the received data is less than or equal to a data adjustment threshold, wherein the data is displayed when the adjustment amount is less than or equal to the data adjustment threshold or the data is stored when the adjustment amount is greater than the data adjustment threshold.

19. The apparatus of claim 18, wherein the priority data is safety data.

20. The apparatus of claim 19, wherein the safety data is displayed at an upper layer of a display, the safety data being displayed as one or more safety pixels, the ROI being a portion of the display.

21. The apparatus of claim 20, wherein the one or more safety pixels correspond to one or more opaque pixels.

22. The apparatus of claim 20, wherein each of the one or more safety pixels is associated with alpha information, the alpha information including at least one of a foreground alpha value or a background alpha value.

23. The apparatus of claim 18, wherein the adjustment amount is detected based on at least one detection algorithm, the at least one detection algorithm corresponding to at least one cyclic redundancy check (CRC).

24. The apparatus of claim 23, wherein the at least one CRC includes at least one polynomial, the at least one polynomial being programmable or configurable.

25. The apparatus of claim 18, wherein the data is displayed at a display.

26. The apparatus of claim 18, wherein the data is stored in at least one of a first memory or a buffer.

27. The apparatus of claim 18, wherein the adjustment amount is detected based on at least one detection algorithm.

28. The apparatus of claim 18, wherein the at least one processor is further configured to:
communicate the data based on the detected adjustment amount.

29. The apparatus of claim 18, wherein the at least one processor is further configured to:
generate a data signature for the received data based on the adjustment amount of the received data.

30. The apparatus of claim 29, wherein the data signature for the received data is compared to a data signature for processed data.

31. The apparatus of claim 29, wherein the data signature for the received data is a cyclic redundancy check (CRC) signature.

32. The apparatus of claim 18, wherein the at least one data source corresponds to the ROI.

33. The apparatus of claim 18, wherein the adjustment amount is detected by a display processing unit (DPU).

34. The apparatus of claim 18, wherein the adjustment amount is detected based on at least one detection algorithm, the at least one detection algorithm corresponding to at least one multiple-input signature register (MISR) or at least one exclusive OR (XOR) algorithm.

35. An apparatus for data processing, comprising:
means for receiving data including a plurality of data bits, the data being associated with at least one data source;
means for determining whether at least a portion of the data corresponds to priority data, the priority data being within a region of interest (ROI);
means for detecting an adjustment amount of the received data when at least the portion of the data corresponds to the priority data, the data being displayed or stored based on the detected adjustment amount; and
means for determining whether the adjustment amount of the received data is less than or equal to a data adjustment threshold, wherein the data is displayed when the adjustment amount is less than or equal to the data adjustment threshold or the data is stored when the adjustment amount is greater than the data adjustment threshold.

36. The apparatus of claim 35, further comprising:
means for communicating the data based on the detected adjustment amount.

37. The apparatus of claim 35, further comprising:
means for generating a data signature for the received data based on the adjustment amount of the received data.

38. A non-transitory computer-readable medium storing computer executable code for data processing, the code when executed by a processor causes the processor to:
receive data including a plurality of data bits, the data being associated with at least one data source;
determine whether at least a portion of the data corresponds to priority data, the priority data being within a region of interest (ROI);
detect an adjustment amount of the received data when at least the portion of the data corresponds to the priority data, the data being displayed or stored based on the detected adjustment amount; and
determine whether the adjustment amount of the received data is less than or equal to a data adjustment threshold, wherein the data is displayed when the adjustment amount is less than or equal to the data adjustment threshold or the data is stored when the adjustment amount is greater than the data adjustment threshold.

* * * * *